United States Patent [19]

Mayhew, Jr.

[11] Patent Number: 4,840,068
[45] Date of Patent: Jun. 20, 1989

[54] PIPE PRESSURE SENSOR

[76] Inventor: John D. Mayhew, Jr., 6831 Campbell Dr., Salem, Va. 24153

[21] Appl. No.: 168,077

[22] Filed: Mar. 14, 1988

[51] Int. Cl.⁴ .............................................. G01L 7/08
[52] U.S. Cl. ..................................... 73/730; 73/706; 73/715
[58] Field of Search ................ 73/730, 706, 861.47, 73/861.48, 119 A, 715; 92/5

[56] References Cited

U.S. PATENT DOCUMENTS

| | | | |
|---|---|---|---|
| 1,864,906 | 6/1932 | Hirsch | 73/706 |
| 2,568,238 | 9/1951 | Le Van | 73/395 |
| 2,841,984 | 7/1958 | Green | 73/395 |
| 3,581,572 | 6/1971 | Frick | 73/706 |
| 3,645,139 | 2/1972 | Zavoda | 73/406 |
| 4,109,535 | 8/1978 | Reed et al. | 73/706 |
| 4,218,926 | 8/1980 | DeVisser | 73/730 |
| 4,489,613 | 12/1984 | Valletti | 73/730 |
| 4,534,224 | 8/1985 | Raftis | 73/730 |

OTHER PUBLICATIONS

Elastoflex–Pressure Sensors
M&G Diaphragm Seals–AMETEK.
Bellofram–Precision Controls Division.

Primary Examiner—Donald O. Woodiel
Attorney, Agent, or Firm—Griffin, Branigan & Butler

[57] ABSTRACT

A pipe pressure sensor (10) comprises a chamber holder (14) for defining a hollow chamber (28) which is urged toward a pipe (20) to clamp a diaphragm (16) between the pipe and a portion of the chamber holder surrounding a pressure-inlet opening (30) into the chamber. The diaphragm has a round, sensing, protrusion (42) with a sensing tip (46) on an outer end thereof for extending outwardly from one side of the diaphragm to extend through a round hole (44) in the pipe so as to communicate pressure in the pipe to the chamber.

4 Claims, 1 Drawing Sheet

PIPE PRESSURE SENSOR

BACKGROUND OF THE INVENTION

Some problems associated with pipes involve the difficulty of monitoring flows therethrough and pressures therein. In this respect, these measurements are interrelated in that flow through a pipe can often be determined by monitoring pressures in the pipe at various positions therealong. For this reason, in order to monitor pressure through pipe lines or strings pressure gauges spaced therealong are often used. Normally, pressure gauge assemblies are mounted on larger pipes, whose pressures are to be monitored, by pipe stands or stubs. That is, a hole is bored in a large pipe whose pressure is to be monitored, the hole is threaded, and thereafter, a small pipe stub having male threads at a mounting end and a pressure gauge on the opposite end is screwed into the hole. Pressure is transmitted to the pressure gauge via the pipe stub and the pressure gauges registers the pressure. A number of pressure sensors for use with pipe stubs are sold commercially. Most of these pressure sensors include a housing having a membrane mounted therein with a pressure inlet on one side of the membrane and a measuring outlet on the other side of the membrane. The pressure inlet normally has female threads for receiving male threads of the pipe stub described above and a narrow passage filled with a liquid is on the other side of the membrane. Movement of this liquid, such as oil, in the narrow passage causes movement of an indicator to monitor pressure in the larger pipe. Of course, pressure in the larger pipe causes movement of the membrane which, in turn, moves the liquid.

There are several difficulties often associated with the above described arrangement. When the pipe whose pressure is being measured is transporting a slurry, such as a coal slurry, solid particles therein tend to clog, or fill, gaps, or holes in the pipe. Thus, in many applications, the pipe stubs giving access to the membranes are clogged by solid or sticky substance thereby not allowing transmission of pressure to the membranes and causing the gauges to give improper readings. It is an object of this invention to provide a pipe pressure sensor which can be accurately used with pipes transporting slurries and which is not unduly subject to being clogged by solid, or sticky, substances. Some prior-art pipe pressure measuring devices of the type described above include purge ports and must be periodically purged with a pressurized fluid. It is an object of this invention to provide a pipe pressure sensor which can be used to measure pressures in slurry transporting pipes without needing to be periodically purged.

Yet another difficulty with the above-described prior art arrangement is that the small measuring passage located above the membrane often must be filled with oil. Such a thin passage is difficult to fill with oil without leaving air bubbles therein. In order to properly fill some gauges with oil, it is necessary to apply a vacuum to the passage. It is an object of this invention, to provide a pipe pressure sensor which can be filled with a liquid without the application of a vacuum.

In order to avoid the above-described clogging problems associated with pipe pressure gauges utilizing small pipe stubs, some pipe pressure gauges comprise pressure-sensing sections of pipes which are installed by cutting out a section from a pipe string and filling the gap left thereby with the pressure sensor pipe section. Some such pressure-sensor pipe sections have membranes extending about the entire inner surfaces of the substitute sections so that there is no hole which can become clogged prior to the membranes. Again movement of the membranes causes movement of liquid in passages on opposite side of the membranes. Although such pressure-measuring pipe sections are highly beneficial for small pipes, where it is easy to replace a section of pipe and where such a specialized section would not be unduly expensive, such a section is often not particularly practical for pipes whose diameters are greater than three inches. Several such pressure detectors are described in U.S. Pat. Nos. 4,534,224 to Raftis and 4,218,926 to DeVisser. It is an object of this invention to provide a pipe pressure sensor which can be easily and relatively inexpensively mounted on large diameter pipe strings but yet which does not involve the use of a pipe stub whose passage could get clogged.

A pipe pressure sensor has been suggested which is mounted to a pipe by boring a hole in the pipe, inserting a housing of a pressure gauge having a membrane mounted therein down through the hole, and welding the housing to the pipe. Such an arrangement has benefits, however, the housing still has an opening leading to a membrane which can become clogged. It is an object of this invention to provide a pipe pressure sensor which does not involve a passage leading to a pressure sensing membrane which can become clogged.

Many types of prior-art pipe pressure sensors can only be used with specific types of pipe. It is an object of this invention to provide a pipe pressure sensor which is not only inexpensive and satisfactorily accurate, but which can be used with various types of pipe includes both plastic and metal pipes.

Some prior art pressure sensors require discontinuities in the walls of pipes with which they are used. For example, some require holes in the walls of the pipes and some require protrusions in the walls of the pipes. Fluid flows through these pipes are disrupted by these discontinuities, thereby causing turbulence which can increase wear on pipe-string systems. It is an object of this invention, to provide a pipe pressure sensor which does not create a turbulence-creating discontinuity on the inner surface of a pipe whose pressure is being measured.

It is a further object of this invention to provide a pipe pressure sensor which is inexpensive to manufacture and install.

SUMMARY

According to principles of this invention, a wide flat flange of a diaphragm having a narrower, round, sensing protrusion thereon is clamped to a pipe outer surface with the sensing protrusion extending through a bored hole in the pipe. The bored pipe hole is about the same diameter as the sensing protrusion and the sensing protrusion is a length such that a sensing tip on the outer end thereof lies approximately even with an inner surface of the pipe. A sensing liquid is held above the membrane in a chamber of a chamber holder and a pressure sensing indicator communicates with the chamber for measuring movement of the sensing liquid.

The pipe pressure sensor can be welded onto a pipe or clamp thereto.

BRIEF DESCRIPTION OF THE DRAWING

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 1A:
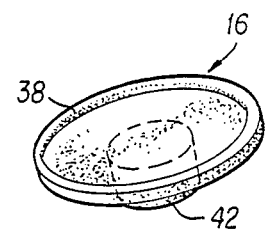
FIG. 1A is an isometric view of a diaphragm used in the pipe pressure sensor of FIG. 1.

A pipe pressure sensor 10 comprises a pressure gauge 12 (with an indicator 13), a round chamber holder 14, a resilient diaphragm 16, and a strap 18. The pipe pressure sensor 10 is clamped onto a pipe 20 by use of bolts 22 passing through flanges 24 and 26 in the chamber holder 14 and engaging female threaded holes in the strap 18.

The cylindrically-shaped chamber holder 14 defines a relatively-large (1¼ inch diameter, and 1½ inch long) sensing liquid chamber 28 having a pressure inlet 30 and a pressure outlet 32. The sensing-liquid chamber 28 has a fluid therein, such as an oil 34, for transmitting pressures from the pressure inlet 30 to the pressure outlet 32. The pressure gauge 12 is a gauge of a standard type for measuring movement of, or pressure in, the fluid. This gauge 12 is mounted by means of a small tube 36 at the pressure outlet 32 to communicate with the sensing liquid 34 in the sensing-liquid chamber 28. As can be seen in FIG. 1, a wide, flat, flange 38 of the diaphragm 16 is clamped completely about its periphery between the chamber holder 14 and an outer surface 40 of the pipe 20 so as to form a sealed interface between the chamber holder 14 and the outer surface 40 of the pipe. In this respect, the chamber holder 14 is circular in shape when looked at from the top and therefore defines the circular sensing-liquid chamber 28. A narrower, round, sensing protrusion 42 of the diaphragm 16 extends away from the wide flat flange 38 and, when the pipe pressure sensor 10 is mounted on a pipe, extends through a drilled, round hole 44 in the pipe 20. In this regard, the sensing protrusion 42 has a diameter of one inch as does the hole 44 in one embodiment. The diaphragm 16 is molded as one piece of a resilient resinous plastic material, such as rubber. A sensing tip 46 on the outer end of the sensing protrusion 42 is located even with an inner surface 48 of the pipe 20 when the pipe pressure sensor 10 is clamped on the outer surface of the pipe 20. In this regard, the walls of most pipes larger than three inches is one half inch. Thus, for most applications the length of the sensing protrusion 42 will be approximately one half inch from the lower surface of the flange 38. When the diaphragm 16 is mounted on a pipe as shown in FIG. 1, it naturally bends about the pipe so that the shape of a sensing tip 46, which was flat prior to mounting, is also bent to conform to the shape of the inner surface 48 of the pipe.

A fill plug 50 can be screwed in and out of a threaded hole 52 in the chamber holder 14 to allow a sensing liquid, such as an oil, to be inserted into the sensing-liquid chamber 28.

Before the pipe pressure sensor 10 is mounted on the pipe 20, the flange 38 of the diaphragm 16 is glued to a surface 54 on the lower side of the chamber holder 14 so as to hold the diaphragm 16 in place on the chamber holder 14 covering the lower end of the sensing-liquid chamber 28. Thus, the sensing-liquid chamber 28 can be turned sideways, with the fill plug 50 directed upwardly, and filled with a sensing-liquid at a factory at which the pressure sensor 10 is manufactured.

Figure 1:
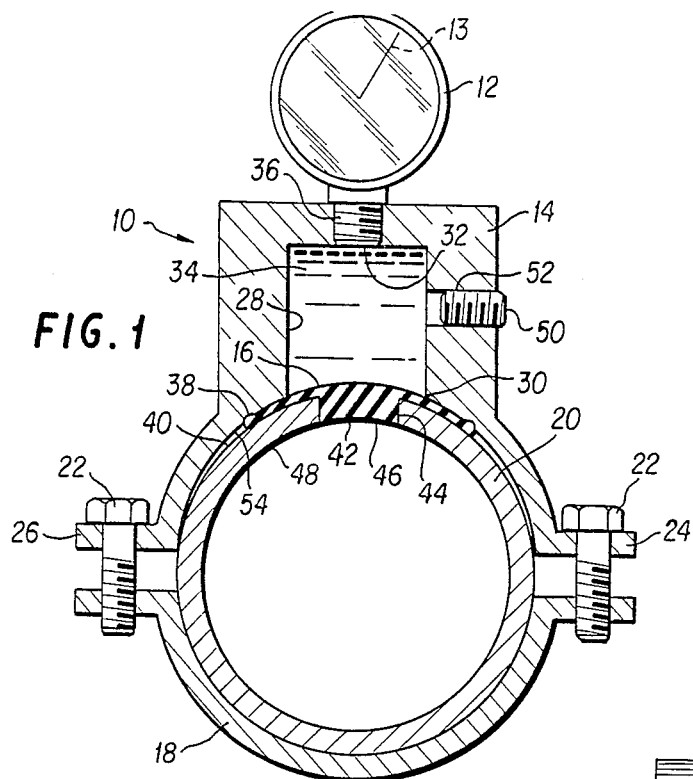
FIG. 1 is a cross sectional front view of a pipe pressure sensor of this invention mounted on the pipe.
Figure 2:
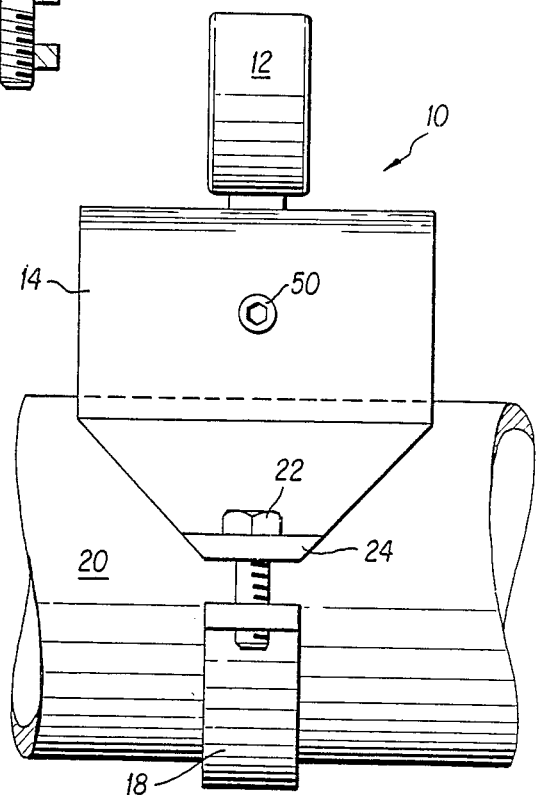
FIG. 2 is a side view of the apparatus of FIG. 1.

In use of the pipe pressure sensor 10 of FIGS. 1, 1A and 2, it is determined at what point along a pipe the pipe pressure sensor 10 is to be mounted and a one inch round hole 44 is bored in the pipe at that point. The chamber holder 14, with its attached pressure gauge 12 is detached from the strap 18 by rotating bolts 22. The chamber holder 14, with its glued-on diaphragm 16 and the sensing liquid 34 in the sensing-liquid chamber 28, is manipulated on the pipe 20 until the sensing protrusion 42 drops into the hole 44. This manipulation can be performed by placing one's eye at the pipe and looking along the pipe toward the pipe pressure sensor 10. When one is in this position, the sensing protrusion 42 can be viewed and it can be seen, as well as felt, when the protrusion 42 drops into the hole 44. At this point, the strap 18 is placed on the bottom of the pipe 20 and the bolts 22 are engage therewith, thereby pulling the chamber holder 14 and the strap 18 together on the pipe 20 and clamping the flange 38 of the diaphragm 16 between the lower surface 54 of the chamber holder 14 and the outer surface 40 of the pipe 20. At this point, the pressure inlet 30 of the sensing-liquid chamber 28 is completely closed off by the diaphragm 16 and is sealed by this clamping action. The sensing tip 46 of the sensing protrusion 42 conforms approximately to, and is approximately even with the inner surface 48 of the pipe 20. Pressure within the pipe 20 presses upwardly, as viewed in FIG. 1, against the sensing tip 46 of the diaphragm 16, thereby urging the diaphragm upwardly into the sensing-liquid chamber 28, compressing and moving the sensing liquid 34. This movement of the compressed sensing liquid 34 is indicated by the indicator 13 on the pressure gauge 12.

Figure 3:
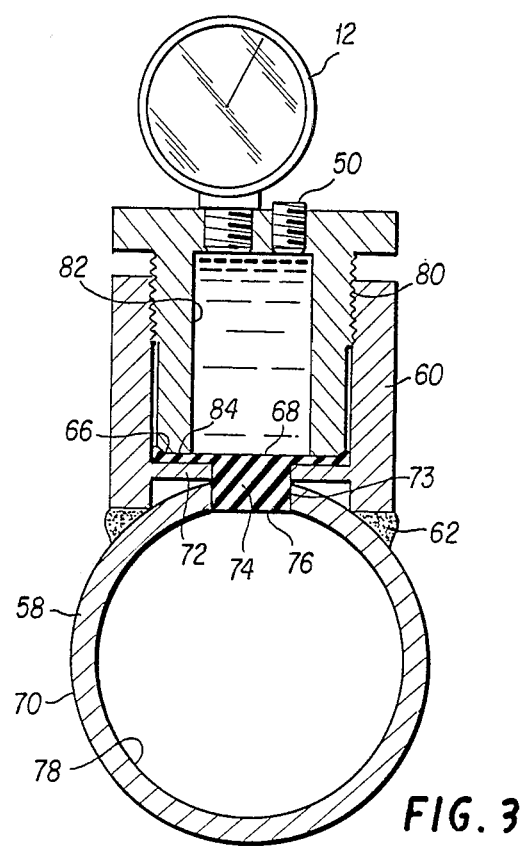
FIG. 3 is a cross sectional front view of a second embodiment of the pipe pressure sensor of this invention.

FIG. 3 shows an alternate embodiment in which a pipe pressure sensor 56 is mounted on a pipe 58 by means of a pressure container 60 which is welded to the pipe 58 at a sealing weld 62 extending completely about a round housing. Thus, once the pressure container 60 is welded to the pipe 58 it is more or less, an extension of the pipe 58. In this embodiment, a flange 66 of a diaphragm 68 is not clamped directly to an outer surface 70 of the pipe 58 as in the FIGS. 1, 1A and 2 embodiment, but rather is clamped to a floor 72 of the welded pressure container 60 which, in turn, is sealingly welded to the outer surface 70 of the pipe 58. The floor 72 has a one inch hole 73 therein.

Also in this embodiment, a round, one-inch-diameter, sensing protrusion 74 of the diaphragm 68 must be longer than the sensing protrusion in the FIGS. 1, 1A and 2 embodiment since it must extend through the floor 72 of the pressure container 60 and the wall of the pipe 58 so that its sensing tip 76 lies approximately even with an inner surface 78 of the pipe 58. In this embodiment, the diaphragm 68 is not flexed to conform to the outer surface 70 of the pipe 58, and therefor, it is desirable to mold the sensing tip 76 to have a profile conforming to the inner surface 78 of the pipe 58.

The chamber holder 64 screws into the welded pressure container 60 at threads 80.

In use of the embodiment of FIG. 3, a chamber 82 of the chamber holder 64 is filled with a sensing liquid through the fill plug 50 at the factory. Again, the flange 66 of the diaphragm 68 is adhered to a circular bottom end surface 84 of the chamber holder 64 in order to retain a liquid in the chamber 82. To mount the pipe pressure sensor 56 the chamber holder 64, with its attached pressure gauge 12 and adhered diaphragm 68, is screwed out of the welded pressure container 60. The welded pressure container 60 is placed on the pipe 58 with a lower end of its housing 63 making contact with the outer surface of the pipe 58 about its complete circumference. A sealing weld 62 is performed completely about the circumference of the lower end of the housing 63 of the pressure container 60. Thereafter, a one inch drill bit is placed in the one inch hole 73 of the floor 72 of the pressure container 60 and is used to bore a one inch hole through the pipe 58 coaxial with the hole 73. Thereafter, the chamber holder 64 is screwed into the pressure container 60 and its sensing protrusion 74 naturally finds its way through the hole 73 in the floor 72 and the newly bored hole in the wall of the pipe 58. Indexing marks are placed on the chamber holder 64 to show a worker the exact point to which the chamber holder 64 should be screwed into the pressure container 60 so that the contoured sensing tip 76 of the sensing protrusion 74 is aligned with the inner surface 78 of the pipe 58.

Once the pipe pressure sensor 56 is mounted on the pipe 58, pressure within the pipe 58 acts on the sensing tip 76 of the protrusion 74 to drive the diaphragm 68 up into the chamber 72, thereby placing pressure on a liquid therein, which pressure is measured by the pressure gauge 12.

It will be appreciated by those of ordinary skill in the art that the sensing protrusions of the diaphragms in both embodiments disclosed for this invention completely fill the holes bored in the pipes and therefore solid particles are not free to fill up any passage for preventing pressure from being transmitted to a pressure sensor. Simultaneously, since the sensing tips of the protrusions are located approximately at the inner surfaces of the pipes, they do not unduly create unusual turbulence, thereby preventing smooth flow and causing undue wear. Along these lines, it is not necessary to have purge ports or to purge the pipe pressure sensors of this invention, since there are no passages which could become clogged.

Just as importantly, the pipe pressure sensors of this invention are inexpensive construct but yet are extremely easy to mount. In this regard, it is not necessary to take out a pipe section in order to mount the pipe pressure sensors of this invention, but rather one must merely bore a hole through a pipe. Further, this invention can be used with both plastic and metal pipe. In addition, because the sensing-liquid chamber is so large it can be easily filed without the application of a vacuum thereto.

While the invention has been particularly shown and described with reference to a preferred embodiment, it will be understood by those skilled in the art that various changes in form and detail may be made therein without departing from the spirit and scope of the invention. For example, it would not be necessary to contour the sensing tip of the sensing protrusion in all cases.

The embodiments of the invention in which an exclusive property or privilege are claimed are defined as follows:

1. A pressure sensor to be mounted on a pipe having a hole therein for measuring the pressure of fluid in the pipe comprising:

a chamber holder for defining a hollow chamber having a pressure inlet opening and a pressure outlet opening;

a pressure gauge attached to said chamber holder and communicating with said hollow chamber through said pressure outlet for measuring the pressure of a fluid in said hollow chamber;

a fluid in said chamber;

a mounting means for engaging a pipe and said chamber holder and mounting said chamber holder on said pipe by urging the pressure-inlet opening of said chamber holder toward said pipe;

a diaphragm comprising a wide flat flange means and a narrower, round, sensing protrusion with a sensing tip on the outer end thereof extending outwardly from one side of the diaphragm, said flange means having the function of being positioned between said chamber holder and an outer surface of said pipe to form a sealed interface between a portion of said chamber holder surrounding said pressure-inlet opening and said pipe, said protrusion extending through said hole in said pipe so as to communicate pressure of fluid in the pipe to the fluid in the chamber via the diaphragm, said sensing protrusion having a length such that when the pressure sensor is mounted on said pipe the sensing tip of said sensing protrusion is positioned approximately at an inner surface of said pipe and a diameter which is approximately the same as the diameter of said hole;

whereby a hole can be bored in said pipe having a diameter of approximately the diameter of said round sensing protrusion, said pressure sensor can be mounted at said hole with said sensing protrusion extending therethrough so that pressure of fluid in said pipe is transmitted to said pressure gauge via said sensing protrusion.

2. A pressure sensor as in claim 1, wherein said mounting means is a strap for extending about said pipe and engaging said chamber holder and wherein said flange means has the function of contacting the outer surface of said pipe for forming said sealed compression interface between said portion of said chamber holder and said surface of said pipe.

3. A pressure sensor as in claim 1, wherein said mounting means includes a piece welded to said pipe and said diaphragm flange has the function of contacting said piece welded to said pipe to form said sealed compression interface.

4. A method of sensing the pressure in a pipe comprising the steps of:

boring a hole in said pipe to have a particular diameter;

positioning a diaphragm on the outside of said pipe at said bored hole, said diaphragm comprising a wide flat flange means and a narrow, round, sensing protrusion with a sensing tip on the outer end thereof extending outwardly from one side of the diaphragm, said round sensing protrusion having a diameter which approximately the same as the particular diameter of the hole bored in the pipe, said step of mounting said diaphragm on said pipe at said hole, including the substep of inserting said sensing protrusion through said hole;

mounting a chamber holder defining a hallow chamber on said pipe at said hole, above said diaphragm, said chamber holder defining a hallow chamber having a pressure inlet opening and a pressure outlet opening, a portion of said chamber holder surrounding said pressure inlet opening contracting said flat flange means to surround said sensing protrusion;

applying a force to said chamber holder to urge said chamber holder towards said pipe, and thereby form a sealed interface between said pipe and said chamber holder at said flat flange means;

measuring the pressure of a fluid in said chamber of said chamber holder which is communicated to said chamber via said diaphragm protrusion.

* * * * *